United States Patent
Lake-Maiorana

(10) Patent No.: US 9,472,930 B2
(45) Date of Patent: Oct. 18, 2016

(54) COVERINGS FOR ELECTRIC CORDS AND METHODS OF COVERING ELECTRIC CORDS

(71) Applicant: Lisa L. Lake-Maiorana, Sewell, NJ (US)

(72) Inventor: Lisa L. Lake-Maiorana, Sewell, NJ (US)

( * ) Notice: Subject to any disclaimer, the term of this patent is extended or adjusted under 35 U.S.C. 154(b) by 123 days.

(21) Appl. No.: 14/258,303

(22) Filed: Apr. 22, 2014

(65) Prior Publication Data
US 2015/0143683 A1 May 28, 2015

Related U.S. Application Data

(60) Provisional application No. 61/907,616, filed on Nov. 22, 2013.

(51) Int. Cl.
*H02G 3/04* (2006.01)
*B23P 19/10* (2006.01)

(52) U.S. Cl.
CPC .......... *H02G 3/0462* (2013.01); *H02G 3/0487* (2013.01); *B23P 19/10* (2013.01); *Y10T 29/4987* (2015.01); *Y10T 29/49869* (2015.01); *Y10T 428/13* (2015.01)

(58) Field of Classification Search
CPC ............. Y10T 428/13; Y10T 29/4987; Y10T 29/49869; B23P 19/10; H02G 3/0462; H02G 3/0487
USPC ...... 29/449, 450; 428/34.1; 174/34, 36, 350, 174/360
See application file for complete search history.

(56) References Cited

U.S. PATENT DOCUMENTS

| | | | | |
|---|---|---|---|---|
| 1,485,994 A | * | 3/1924 | Salisbury | H02G 7/00 138/128 |
| 2,632,219 A | * | 3/1953 | Massey | A61F 13/64 24/115 H |
| 4,281,211 A | * | 7/1981 | Tatum | H01B 7/083 174/117 F |
| 4,684,762 A | * | 8/1987 | Gladfelter | D03D 15/00 139/425 R |
| 4,939,778 A | * | 7/1990 | Tomberlin | H04M 1/15 174/136 |
| 4,987,724 A | * | 1/1991 | Rutherford | B65B 5/04 29/235 |
| 5,293,501 A | * | 3/1994 | Bennett | H01B 13/01263 138/128 |
| 5,895,288 A | * | 4/1999 | Nelson | H02G 3/0481 174/135 |
| D445,093 S | * | 7/2001 | Staskey | D13/156 |
| 6,740,818 B2 | * | 5/2004 | Clark | H02G 3/0481 174/135 |
| 7,219,397 B2 | * | 5/2007 | Bishop | H02G 11/00 24/115 R |
| 8,424,341 B2 | * | 4/2013 | Summerford | A44C 15/005 206/6.1 |
| 8,502,069 B2 | * | 8/2013 | Holland | B65D 63/00 139/383 R |
| 9,078,499 B1 | * | 7/2015 | Brabec | A45C 11/00 |
| 2002/0170728 A1 | * | 11/2002 | Holland | B65D 63/00 174/19 |
| 2010/0001495 A1 | * | 1/2010 | Sekino | B60R 21/231 280/729 |
| 2010/0236287 A1 | * | 9/2010 | Summerford | A44C 15/005 63/1.12 |

* cited by examiner

Primary Examiner — Christopher Besler
Assistant Examiner — Bayan Salone
(74) Attorney, Agent, or Firm — Carter, DeLuca, Farrell & Schmidt, LLP

(57) ABSTRACT

A covering for electric cords includes an elasticized fabric sleeve having a first end defining a first opening and a second end defining a second opening. The sleeve defines a lumen between the first and second openings configured to dispose an electric cord therein. The covering further includes a tether slidingly disposed within the lumen of the sleeve adapted to dispose the electric cord within the lumen of the sleeve.

6 Claims, 3 Drawing Sheets

COVERINGS FOR ELECTRIC CORDS AND METHODS OF COVERING ELECTRIC CORDS

CROSS REFERENCE TO RELATED APPLICATIONS

This application claims the benefit of and priority, under 35 U.S.C. §119, to U.S. Provisional Patent Application Ser. No. 61/907,616, filed on Nov. 22, 2013, the entire disclosure of which is incorporated by reference herein for all purposes.

BACKGROUND

A variety of electronic devices, such as, for example, tablets, music listening devices, Televisions, smartphones, PDAs and video game consoles can be found in any modern household. Each of these electronic devices requires a cord to interconnect one or more electronic devices or to connect an electronic device to a power source. Cords are unsightly and can easily tangle with themselves or other cords. Accordingly, there is a need for a way to conceal electric cords to provide a more pleasing aesthetic look and prevent entanglement of cords.

SUMMARY

In one embodiment, a covering for cords is provided. The covering includes an elasticized fabric sleeve having a first end defining a first opening and a second end defining a second opening. The sleeve defines a lumen between the first and second openings configured to dispose an electric cord therein. The covering further includes a tether slidingly disposed within the lumen of the sleeve adapted to dispose the electric cord within the lumen of the sleeve.

In another embodiment, a method of covering an electric cord is provided. The method includes providing a covering for cords including an elasticized fabric sleeve having a first end defining a first opening and a second end defining a second opening. The sleeve defines a lumen between the first and second openings configured to dispose an electric cord therein. A tether is slidingly disposed within the lumen of the sleeve. The method further includes cutting the tether to form first and second ends; attaching the first end of the tether to the electric cord; and pulling the second end of the tether from the lumen of the sleeve to insert the electric cord into the lumen of the sleeve.

Further details, advantages, and aspects of exemplary embodiments of the present disclosure are described in more detail below with reference to the appended figures.

BRIEF DESCRIPTION OF THE DRAWINGS

Embodiments of the present disclosure are described herein with reference to the accompanying drawings, wherein.

DETAILED DESCRIPTION

Figure 1:
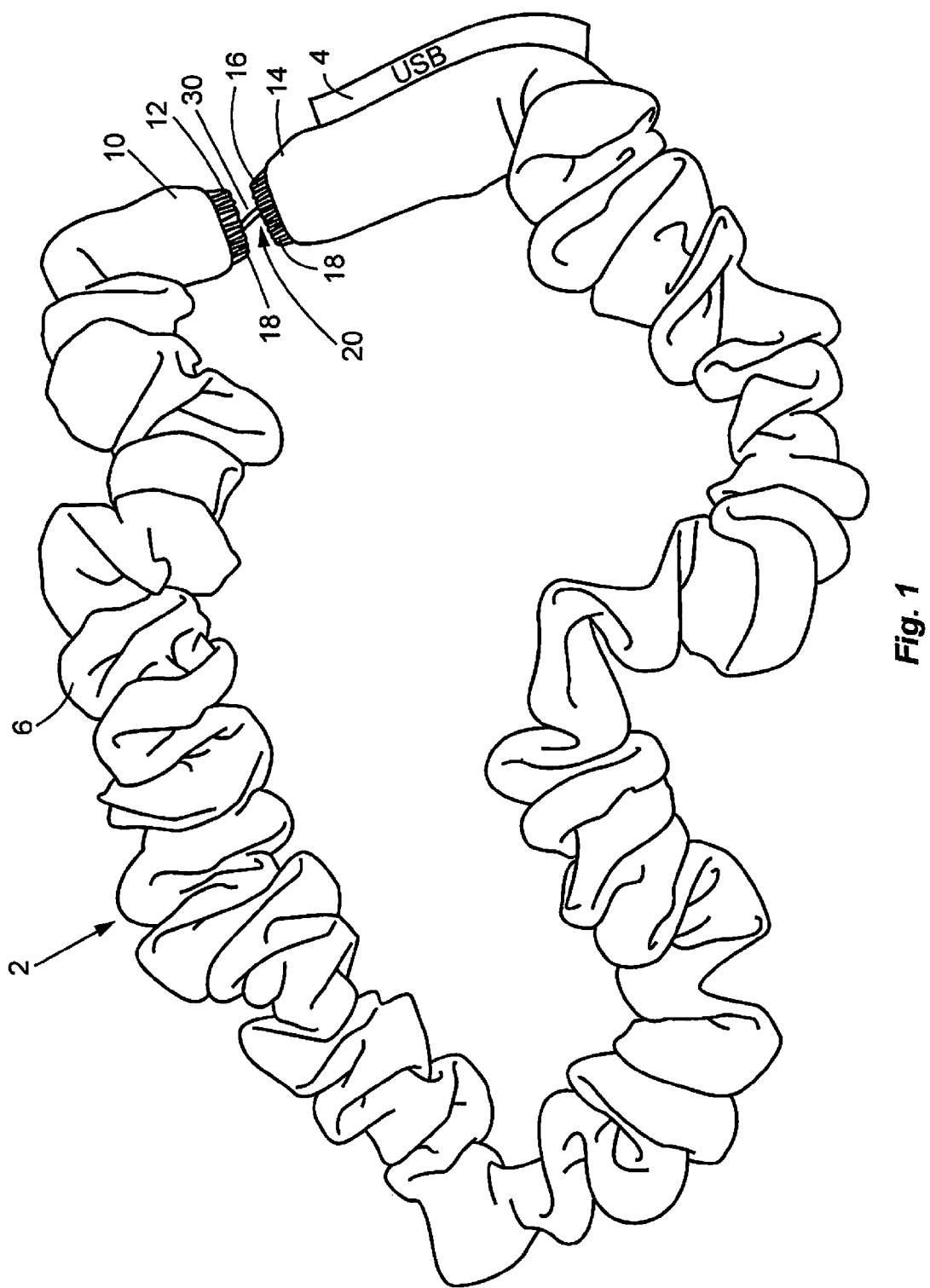
FIG. 1 is a perspective view of a cord covering prior to insertion of an electric cord.

Embodiments of the presently disclosed coverings for cords are described in detail with reference to the drawings, in which like reference numerals designate identical or corresponding elements in each of the several views.

Referring initially to FIG. 1, illustrated is a covering 2 for electric cords, such as, for example, cables used to interconnect various portable electronic devices including, but not limited to, TV's, cell phones, tablets, music listening devices, portable speakers, USB cables, laptops, and chargers thereof. The presently disclosed coverings can also be used to cover power cords that directly connect an electronic device to a power source, for example, a wall outlet.

In some embodiments, the coverings are designed and adapted to remain intact and evenly distributed along a length thereof. In further embodiments, the coverings are designed and adapted to isolate the encapsulated electric cable or cord from ambient signals and electromagnetic forces.

Figure 3:
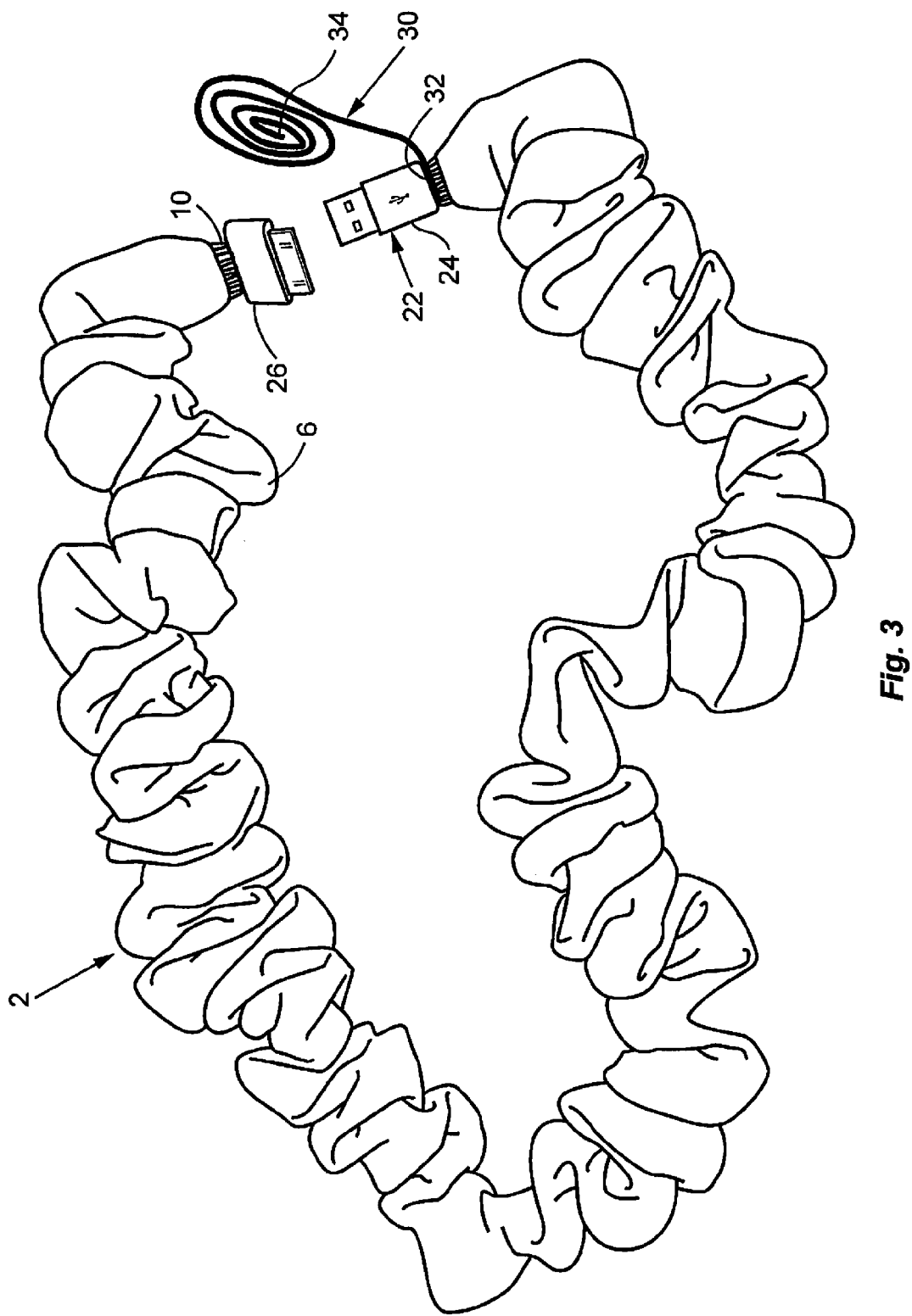
FIG. 3 is a perspective view of the cord covering shown in FIG. 1, having an electronic cord disposed therein.

Covering 2 can include various decorative designs on an outer surface thereof, as shown in FIG. 3. For example, covering 2 may be decorated with beads, mock gems, ribbons, lace, etc. An outer surface of covering 2 can also include various indicia 4 for identifying the type of electric cord disposed therein. Indicia 4 in the illustrated embodiment indicates that a USB cable is disposed in covering 2. However, various other types of indicia can be provided. It is contemplated that various types of indicia can be interchanged (e.g., via Velcro tabs) depending on the type of electric cord being covered. In this way, upon encasing an electric cord within covering 2, a user will be able to identify the type of electric cord disposed in covering 2. In some embodiments, covering 2 can be color coded for easier identification of the electric cord disposed therein.

Covering 2 includes an elasticized sleeve 6 constructed from one or more types of fabric. In some embodiments, sleeve 6 can be fabricated from various materials, such as, for example, synthetic or natural fibers, linen, muslin, silk, cotton, velvet, satin, nylon, polyester, leather, lycra containing materials, plastics, or a combination thereof. Sleeve 6 can be made from a strip of fabric or film material by joining long edges of the strip to form a tube via sewing or gluing. Sleeve 6 has a length of approximately 100 inches and a diameter of approximately 3 inches. It is contemplated that sleeve 6 can be variously dimensioned and configured to accommodate various types of electric cords. In some embodiments, sleeve 6 has a length that is substantially equal to twice the length of the electric cord it is intended to cover. In other embodiments, sleeve 6 has a length that is 2-3 times a length of an electric cord it is intended to cover. It is contemplated that an inner periphery of sleeve 6 is lined or coated with a flame retardant material, such as, for example, nylon.

Sleeve 6 can be extended between a first, scrunched configuration, in which sleeve 6 has a first length, and a second, stretched configuration, in which sleeve 6 has a second length, greater than the first length. Sleeve 6 is biased to the scrunched configuration due to the elastic properties of the fabric from which sleeve 6 is constructed. Sleeve 6 can also be treated with an animal repelling substance, such as, for example, methyl nonyl ketone.

Sleeve 6 extends between a first end 10 defining a first opening 12 and a second end 14 defining a second opening 16. First and second ends 10, 14 each include an elastic closure 18 that is stretchable between a first diameter and a second diameter large enough to allow passage of certain end components of electric cords therethrough. After the end components are passed through elastic closures 18, elastic closures 18 shrink about the cables of the electric cords. In some embodiments, first and second ends 10, 14 have various closures, such as, for example, hook and loop or string closures.

Figure 2:
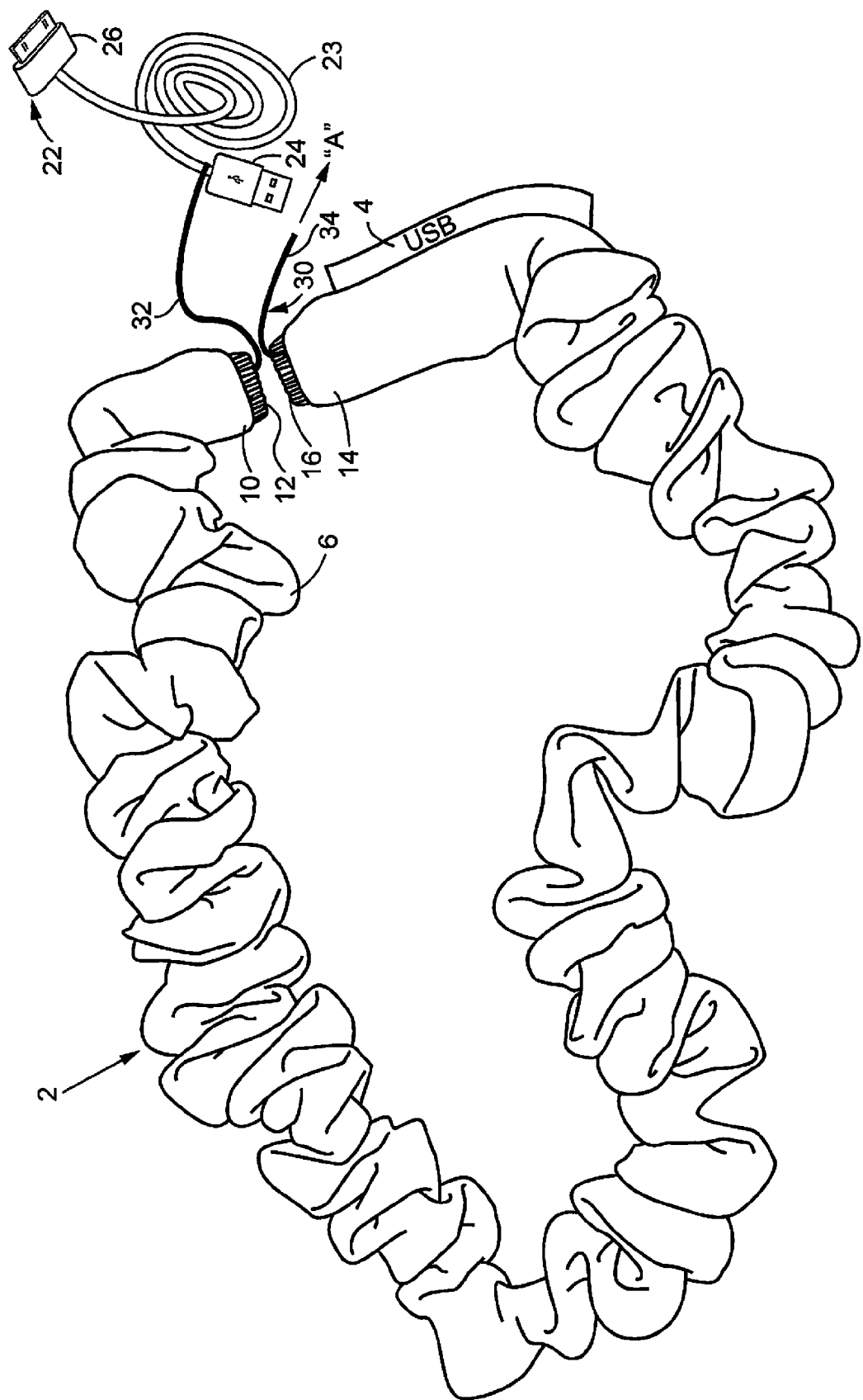
FIG. 2 is a perspective view of the cord covering shown in FIG. 1 attached to an electric cord.

Sleeve 6 further defines a lumen 20 extending between first and second openings 12, 16 configured for disposal of an electric cord, such as, for example, electric cord 22 shown in FIGS. 2 and 3. Lumen 20 has a uniform diameter large enough to accommodate certain end components (e.g., plugs 24, 26) of electric cords. Lumen 20 is expandable to greater diameters to accommodate the passage of relatively large components of certain electric cords.

Covering 2 further includes a tether 30, such as, for example, a string, slidingly disposed within lumen 20 of sleeve 6. Tether 30 is adapted and designed to dispose an electric cord within lumen 20 of sleeve 6, as described in further detail below. Tether 30 has a looped configuration such that sleeve 6 is slidable along an enclosed, circular path of tether 30. In some embodiments, sleeve 6 includes an anchor member (not shown) that slidingly connects tether 30 to lumen 20. Tether 30 may have a diameter substantially equal to a diameter of a cable of an electric cord or have the diameter of a common piece of string. Tether 30 preserves the structural integrity, shape, and ruffles of covering 2 while not in use (e.g., in a packaged state). In one embodiment, tether 30 has a length that is substantially one-half the stretched length of sleeve 6. Other lengths are also contemplated.

In operation, concealment of an electric cord, such as, for example, a USB power adapter charger 22, as shown in FIGS. 2 and 3, is desired. A portion of tether 30 between first and second ends 10, 14 of sleeve 6 is exposed and cut to form first and second ends 32, 34 thereof. First end 32 of tether 30 is attached, e.g., tied, to a first end 24 of charger 22. Second end 34 of tether 30 is translated or pulled, in a direction indicated by arrow "A" in FIG. 2, to translate tether 30 and charger 22 through first opening 12 of sleeve 6 to position a cable 23 of charger 22 within lumen 20 of sleeve 6. Translation of tether 30 through lumen 20 of sleeve 6 is continued until first end 32 of tether 30 and first end 24 of charger 22 exit second opening 16 of sleeve 6 such that first end 24 of charger 22 is adjacent second opening 16 of sleeve 6 and second end 26 of charger 22 is adjacent first opening 12 of sleeve 6, as shown in FIG. 3. Upon removal of tether 30 from lumen 20 of sleeve 6, first end 32 of tether 30 is detached from first end 24 of charger 22. In embodiments, tether 30 can be discarded.

In one embodiment, tether 30 can remain attached to first end 24 of charger 22 after charger 22 is inserted within sleeve 6. In this embodiment, if covering 2 is to be used to cover another electric cord, similar or different from charger 22, charger 22 is removed from sleeve 6 by pulling or translating second end 26 of charger 22 away from first end 10 of sleeve 6. Removal of charger 22 from sleeve 6 translates or draws first end 32 of tether 30 back through lumen 20 repositioning tether 30 within lumen 20 of sleeve 6. First end 32 of tether is detached from first end 24 of charger 22 freeing up the use of tether 30 so that tether 30 can be used repeatedly to place various electric cords within sleeve 6. In the presently disclosed embodiment, an anchor member, such as, for example, a latch or Velcro latch (not shown) can be attached to sleeve 6 to secure tether 30 to sleeve 6 in-between uses of tether 30.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A method of covering an electric cord, comprising:
   providing a covering for cords including:
   an elasticized fabric sleeve having a first end defining a first opening and a second end defining a second opening, the sleeve defining a lumen between the first and second openings configured to dispose an electric cord therein; and
   a tether slidingly disposed within the lumen of the sleeve;
   cutting the tether to form first and second ends while the tether is slidingly disposed within the lumen of the sleeve;
   attaching the first end of the tether to the electric cord; and
   pulling the second end of the tether from the lumen of the sleeve to insert the electric cord into the lumen of the sleeve.

2. The method as recited in claim 1, wherein prior to cutting the tether, the first and second ends of the tether are connected to one another such that the tether has a looped configuration.

3. The method as recited in claim 1, further comprising detaching the first end of the tether from the electric cord.

4. The method as recited in claim 2, wherein after the second end of the tether is pulled, the tether transitions from the looped configuration to a linear configuration.

5. The method as recited in claim 1, wherein the elastic sleeve is biased to a scrunched configuration.

6. The method as recited in claim 1, further comprising slidingly connecting the tether to the lumen of the sleeve using an anchor member.

* * * * *